United States Patent [19]
Best

[11] Patent Number: 5,096,362
[45] Date of Patent: Mar. 17, 1992

[54] RAMP

[75] Inventor: John W. Best, Jonesboro, Ak.

[73] Assignee: Northstar Industries, Inc., Jonesboro, Ak.

[21] Appl. No.: 601,879

[22] Filed: Oct. 22, 1990

Related U.S. Application Data

[62] Division of Ser. No. 349,708, May 10, 1989, Pat. No. 4,979,867.

[51] Int. Cl.⁵ ............................................. B65G 11/12
[52] U.S. Cl. .................................... 414/537; 14/71.1; 182/36
[58] Field of Search ............... 414/480, 522, 537, 538, 414/523, 532, 533, 534, 546, 554, 556; 14/71.1; 193/4, 5, 17; 182/36, 39, 77, 127

[56] References Cited

U.S. PATENT DOCUMENTS

| | | |
|---|---|---|
| 2,900,094 | 8/1959 | Ferguson . |
| 2,902,110 | 9/1959 | Eickholdt ........................ 182/36 X |
| 3,261,051 | 7/1966 | Priest . |
| 3,331,465 | 7/1967 | Matsukata ............................. 182/77 |
| 3,340,960 | 9/1967 | Wilson ................................... 182/39 |
| 3,352,440 | 11/1967 | Wilson . |
| 3,441,153 | 4/1969 | Handley . |
| 4,003,483 | 1/1977 | Fulton ................................... 414/537 |
| 4,021,071 | 5/1977 | Norman .................................. 296/62 |
| 4,043,468 | 8/1977 | Shea ...................................... 414/523 |
| 4,084,713 | 4/1978 | Rohrs et al. ......................... 414/537 |
| 4,098,414 | 7/1978 | Abiera ................................... 414/537 |
| 4,127,201 | 11/1978 | Baumann ............................. 414/537 |
| 4,431,082 | 2/1984 | Bott ................................... 182/36 X |
| 4,647,270 | 3/1987 | Maloney ............................. 414/470 |
| 4,694,522 | 9/1987 | Alten ................................... 14/71.1 |

Primary Examiner—Robert J. Spar
Assistant Examiner—James Keenan
Attorney, Agent, or Firm—Kilpatrick & Cody

[57] ABSTRACT

A ramp attached to and used for the loading and unloading of goods from a vehicle, typically a truck. When not in use, the ramp folds compactly and is latched in an upright position at the rear of the vehicle. The ramp may be unfolded and extended in order to transport goods to and from the vehicle. As used, the ramp also may be latched in a half-ramp arrangement to serve as a bridge or dock plate. In the half-ramp arrangement, the ramp is folded to form two legs of a three-dimensional triangular structure, so that one portion of the ramp supports the other and allows it to bear weight.

7 Claims, 7 Drawing Sheets

RAMP

This is a divisional of copending application Ser. No. 07/349,708 (now U.S. Pat. No. 4,979,867), filed May 10, 1989.

This invention relates to ramps for the loading and unloading of goods.

BACKGROUND OF THE INVENTION

Ramps according to the present invention are lightweight, sturdy, and durable and can be folded and positioned vertically on the rear of a truck. Such a ramp can be mounted to brackets attached to the exterior of the truck and folded compactly so that the ramp does not extend above the vehicle or beyond the truck's rear bumper. Latching means help prevent the ramp from moving while the truck is in motion. By attaching the ramp to the vehicle's exterior rather than placing it inside the bed or cargo space, the volume of that area is made available for storing and transporting goods.

Ramps of the present invention additionally can be pivoted and latched in a triangular "half-ramp" arrangement. A second section of the ramp supports a first section in order to allow the first to bear weight according to this arrangement. In this manner the ramp may serve as a dock plate bridging the distance between the truck and a loading dock. The triangular truss structure of the half-ramp arrangement allows the lightweight ramp to be able to absorb large downward forces as might occur when heavy goods are being loaded or unloaded.

Ramps of the present invention also can be stowed or deployed quickly and easily by one person. Spring cylinders damp the movement of the ramps as they are folded or unfolded for better control. One person may stand either behind or to the side of such a ramp, grasp one or more handles attached to it, and merely pull up or down on the ramp to fold or unfold it.

Ramps of the present invention may include rollers or simply flat surfaces as load-bearing surfaces. Alternatively they may include rows of skate wheel conveyor rollers, each supported by a single axle spanning the width of the ramp. The skate wheel structure also may include a support brace in order to prevent the skate wheel axles from bending under heavy loads.

Ramps of the present invention can be mounted so that their height is adjustable and so that they can be quickly and easily removed. They also may slide laterally along the rear bumper of the truck for rapid positioning in the optimal location for a particular loading or unloading operation.

It is therefore an object of the present invention to provide a lightweight, sturdy, and durable ramp which can be stored easily and compactly.

It is an additional object of the present invention to provide a ramp which can be latched in a triangular half-ramp arrangement to serve as a lightweight but sturdy dock plate between a truck and a loading dock.

It is an additional object of the present invention to provide a ramp which includes spring cylinders for damping movement of the ramp as it is being raised or lowered, thereby allowing one person to position the ramp without difficulty.

It is a further object of the present invention to provide a ramp with skate wheel conveyor rollers in order to facilitate the movement of the cargo along it and to provide a support brace to help prevent the skate wheel axles from deforming under the weight of the goods being loaded or unloaded.

It is another object of the present invention to provide a ramp whose height can be adjusted in relation to the height of the truck bed or the height of a dock.

It is yet an additional object to provide a ramp which can be removed from a truck bumper quickly and easily and may slide laterally along the bumper.

Other objects, features, and advantages of the present invention will become apparent with reference to the remainder of the written portion and the drawings of this application.

DETAILED DESCRIPTION OF THE DRAWINGS

Figure 1:
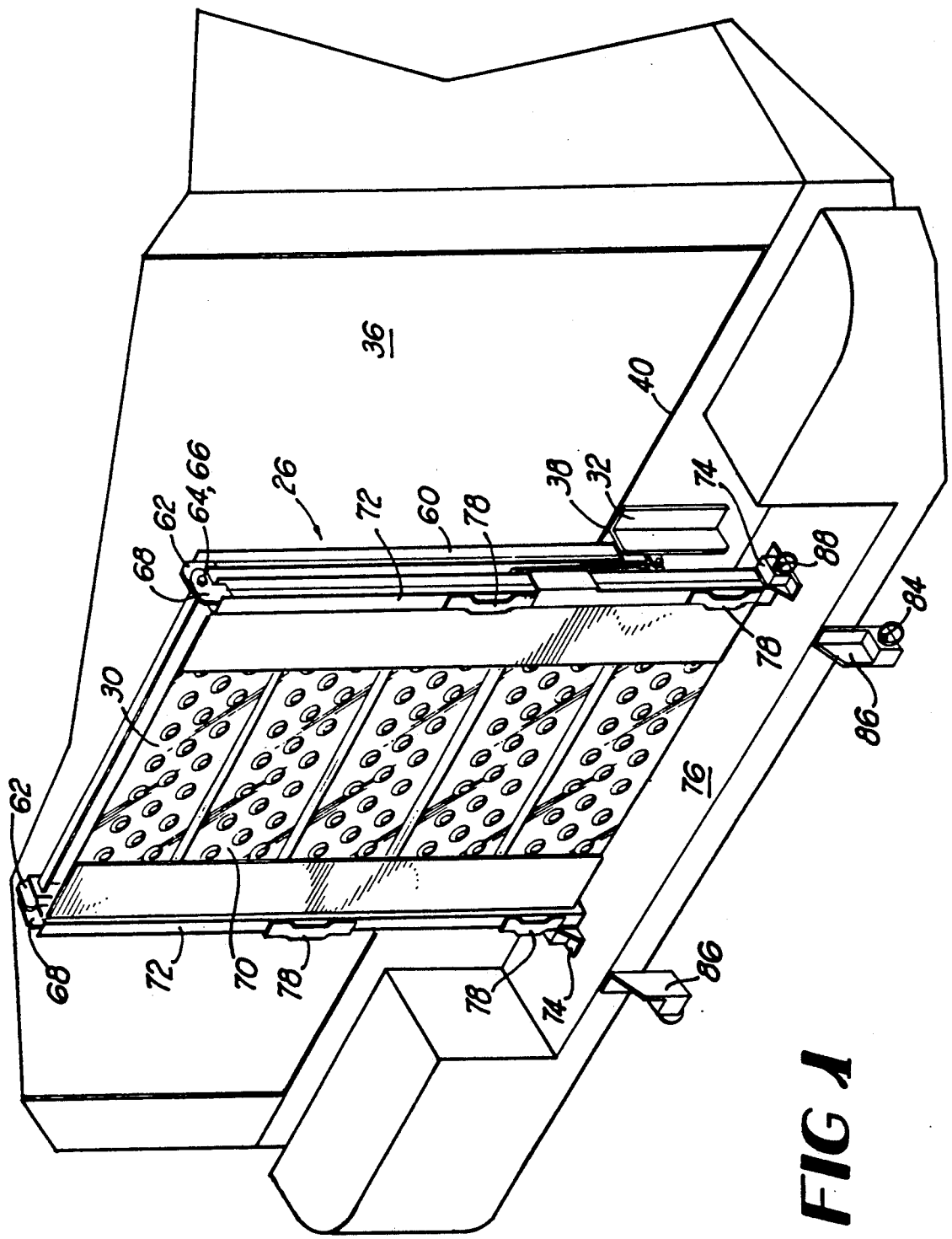
FIG. 1 is a perspective view of a ramp of the present invention folded compactly and mounted on the rear of a truck.
Figure 2:
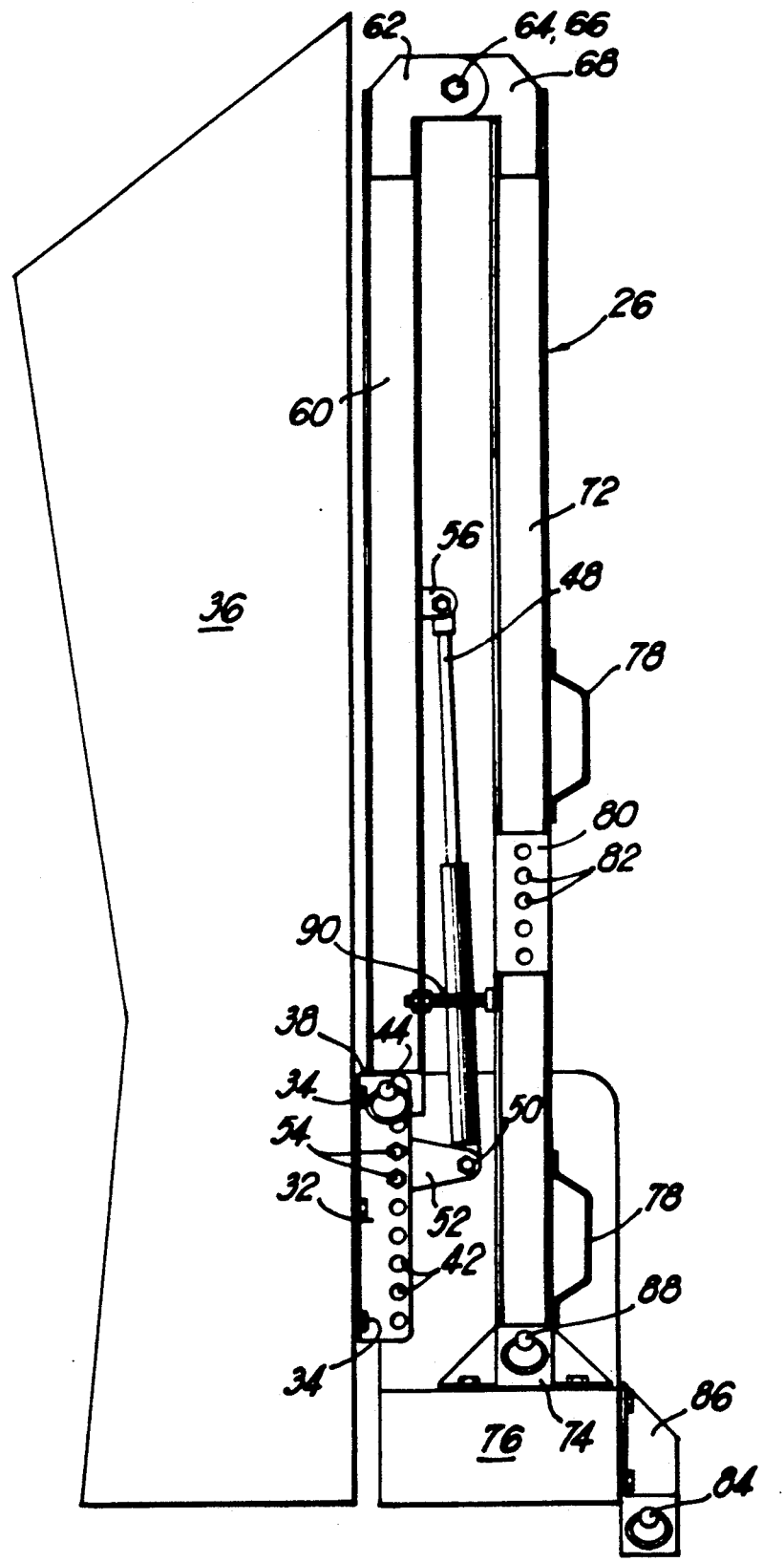
FIG. 2 is a side elevational view of the ramp of FIG. 1.
Figure 3:
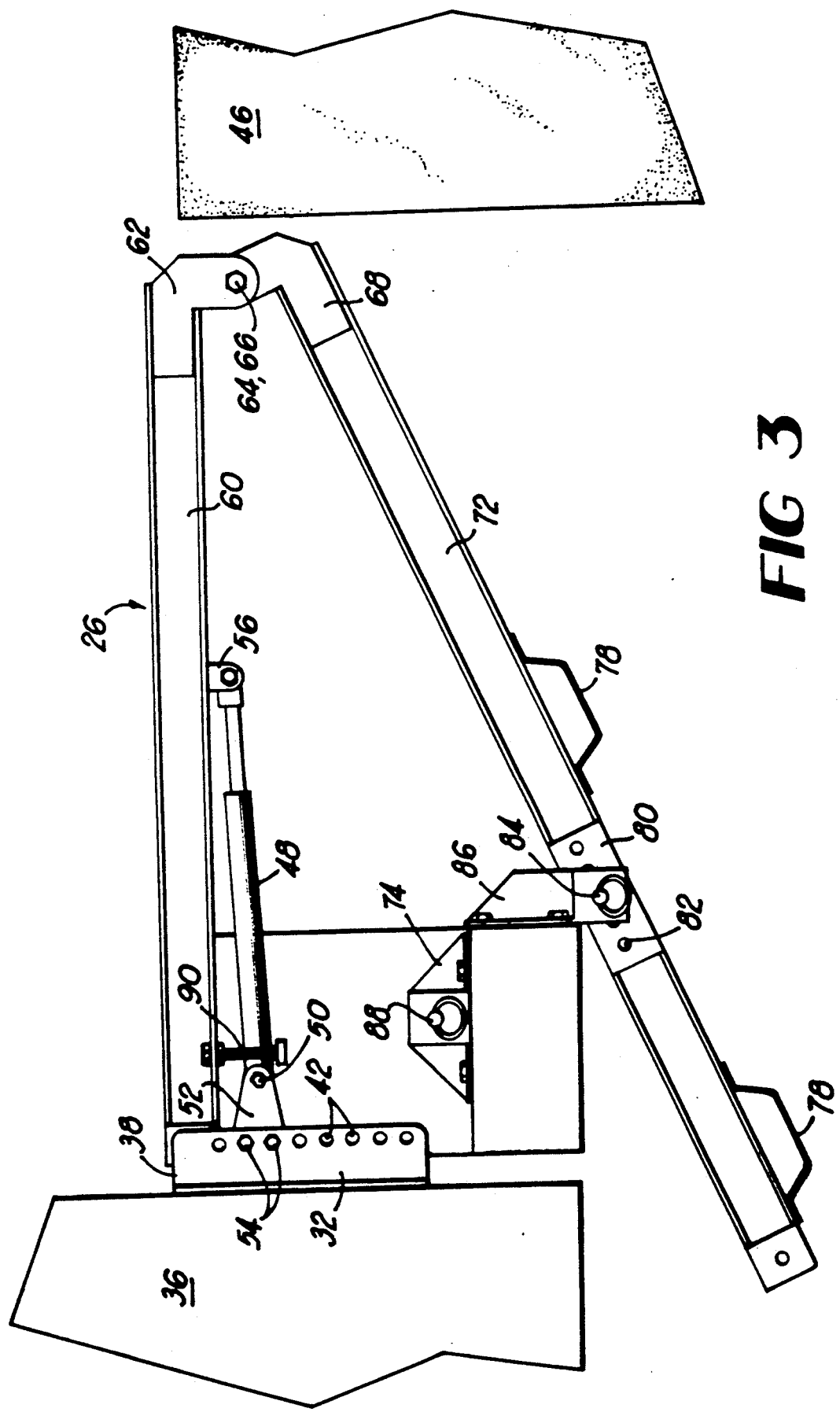
FIG. 3 is a side elevational view of the ramp of FIG. 1 deployed in the half-ramp arrangement.
Figure 4:
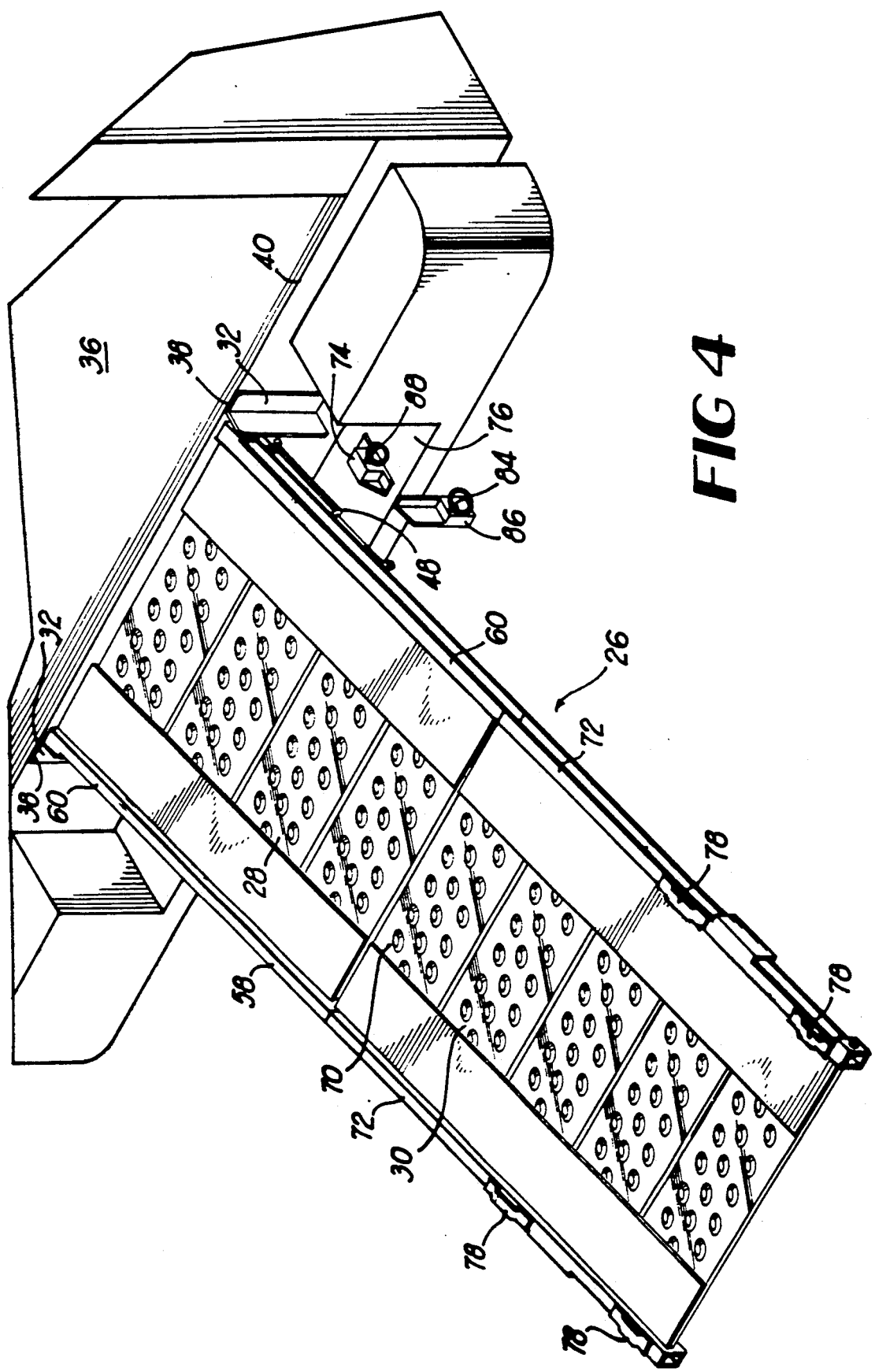
FIG. 4 is a perspective view of the ramp of FIG. 1 fully extended.

FIGS. 1 and 2 are perspective and side elevational views, respectively, of a ramp 26 of the present invention. Ramp 26 is formed generally of a first ramp segment 28 and a second ramp segment 30. First ramp segment 28 is mounted to a vehicle. First and second ramp segments 28 and 30 form load-bearing surfaces for goods to be loaded or unloaded. The surfaces can be flat surfaces, rollers, or skate wheels. First and second ramp segments 28 and 30 are pivotally connected so that ramp 26 can be positioned in a variety of arrangements, including folded as shown in FIGS. 1 and 2, extended as shown in FIG. 4, and in a half-ramp arrangement as shown in FIG. 3.

Referring principally to FIG. 2, ramp 26 includes mounts 32 rigidly mounted with fasteners 34 to the rear of vehicle 36. While the invention contemplates that vehicle 36 will be a truck, for example a Step Van, mounts 32 and ramp 26 can be mounted to other vehicles or to other non-vehicular surfaces. In the preferred embodiment mounts 32 are universal mounting brackets having an "L" shaped cross section and are mounted so that their top edges 38 are flush with the truck bed 40. In addition, mounts 32 contain holes 42, preferrably of equal diameter, along their lengths to allow first ramp segment 28 to connect to the rear of truck 36. In FIG. 2 first ramp segment 28 is shown connected to the uppermost holes 42 of mounts 32 using pins 44 or other appropriate fasteners. By removing pins 44, aligning first ramp segment 28 with holes 42 other than the uppermost holes 42, and reinserting pins 44, the height of the extended ramp shown in FIG. 4 or half-ramp arrangement shown in FIG. 3 relative to the height of the vehicle bed 40 shown in FIG. 4, the dock 46 in FIG. 3, and the ground may be altered quickly and easily.

The ramp of the present invention also may, but need not, include means for damping the movement of ramp 26 as it is being raised or lowered. Such means typically could include one or more spring cylinders 48. Cylinders 48 may be pivotally attached using fasteners 50 to plates 52, which plates 52 are rigidly attached to mounts 32 using fasteners 54 extending through holes 42. Spring cylinders also are rigidly connected to plates 56, which plates 56 are fixedly attached, by welding or other appropriate means, to first ramp segment 28. In this arrangement spring cylinders 48 will pivot along with first ramp section 28 when ramp 26 is folded or unfolded. If fasteners 54 are easily removable, spring cylinders 48 may be raised or lowered as the height of the extended ramp or half-ramp arrangement is altered. In a preferred embodiment, fasteners 50, like fasteners 44, are pins that allow first ramp segment 28 and spring cylinders 48 to be removed as a unit from mounts 32 quickly and easily. Air cylinders, hydraulic cylinders or other appropriate damping means may be used as alternatives to spring cylinders 48.

First ramp segment 28 is formed of first ramp member 58 to which first side pieces 60 and first end pieces 62 have been attached, by welding or other appropriate means. First ramp member 58 typically will be a flat piece of metal having a width sufficient to prevent goods being loaded or unloaded from tipping off the ramp 26 on one side or the other. In a preferred embodiment first ramp member 58 consists of a solid piece of aluminum approximately 27¼ inches wide, which width includes perforations in the aluminum across the center 17¼ inches. First side pieces 60 typically are formed of metal having a "U" shaped cross-section, although the shape and composition of the pieces are not critical to the invention. First side pieces also contain holes (not shown) which receive fasteners 44. First end pieces 62 consist of essentially "L" shaped pieces of material, also typically metal, and also contain holes 64 which receive fasteners 66. Alternatively, each first side piece 60 and first end piece 62 could be combined and formed of a single piece of material.

Fasteners 66 pivotally connect first end pieces 62 of first ramp segment 28 to second end pieces 68 of second ramp segment 30. Second end pieces 68, like first end pieces 62, consist of essentially "L" shaped pieces of material, typically metal, and contain holes 64 which receive fasteners 66. Because fasteners 66 allow first and second ramp segments 28 and 30 to pivot about them, ramp 26 may be positioned in a variety of different ways, including folded compactly as shown in FIG. 2, in which first and second end pieces 62 and 68 pivot to form joint "U" shaped structures, extended as shown in FIG. 4, in which first and second end pieces 62 and 68 pivot to form joint "T" shaped structures, and in a half-ramp arrangement as shown in FIG. 3, in which first and second end pieces 62 and 68 pivot to form joint "W" shaped structures.

In addition to second end pieces 68, second ramp segment 30 also includes second ramp member 70 and second side pieces 72 attached thereto by welding or other appropriate means. Second ramp member 70 and second side pieces 72 generally will be identical to first ramp member 58 and first side pieces 60, respectively, except that second ramp member 70 and second side pieces 72 will be longer than their counterparts of the first ramp segment 28 and that second side pieces 72 will extend slightly beyond the edge of second ramp member 70 as shown in FIG. 4. The increased length of second ramp member 70 and second side pieces 70 stems from the fact that truck bumpers 76 are lower than truck beds 40. In the present invention second side pieces 72 of second ramp segment 30, when ramp 26 is in the folded position of FIG. 2, will extend downward into first brackets 74 attached to the top surface of bumper 76.

Second ramp segment 30 may, but need not, include handles 78 fixedly attached for easy grasping of the ramp 26 when it must be folded or unfolded. Although handles 78 are shown projecting upward when ramp 26 is in the extended position (see FIG. 4), they may be placed in other positions as well. Also attached to second side pieces 72 of second ramp segment 30 are flanges 80, each containing one or more holes 82 of equal diameter. Pins 84 of second brackets 86 extend through holes 82 when ramp 26 is deployed in the half-ramp arrangement as shown in FIG. 3.

When ramp 26 is in the folded position of FIG. 1, second side pieces 72 of second ramp segment 30 extend downward into first brackets 74. First brackets 74 are rigidly affixed to the top surface of vehicle bumper 76. Pins 88 of first brackets 74 engage second side pieces 72 to lock ramp 26 into the folded position and prevent it from moving while vehicle 36 is in motion. Stops 90 rigidly attached to first side pieces 60 and extending horizontally toward second side pieces 72 help prevent second ramp segment 30 from contacting and damaging spring cylinders 48 while ramp 26 is being folded or unfolded. Because stops 90 extend horizontally beyond spring cylinders 48, they serve as a barrier between second ramp segment 30 and the cylinders.

Turning now to FIG. 3, ramp 26 is shown in a half-ramp arrangement. First ramp segment 28 is shown approximately horizontal to the ground and serving as a dock plate, or bridge, between truck bed 40 and dock 46. Second ramp segment 30 is shown folded back toward truck 36 with flanges 80 of second side pieces 72 engaged by pins 84 of second brackets 86 through holes 82. Second brackets 86 are rigidly attached to and extend below truck bumper 76. As shown in FIG. 3, first and second ramp segments 28 and 30 form two legs of a three-dimensional triangle. The third leg, having a length equal to the vertical distance between first ramp segment 28 and pins 84 of second brackets 86, is formed by the connection of second brackets 86 to truck bumper 76, truck bumper 76 and mounts 32 to truck 36, and mounts 32 to first ramp segment 28. This triangular truss structure allows second ramp segment 30 to support first ramp segment 28. First ramp segment 28 therefore may absorb large downward forces as heavy objects ar transported from truck 36 to dock 46 and vice versa, without bending or buckling near first end pieces 62.

Figure 5:
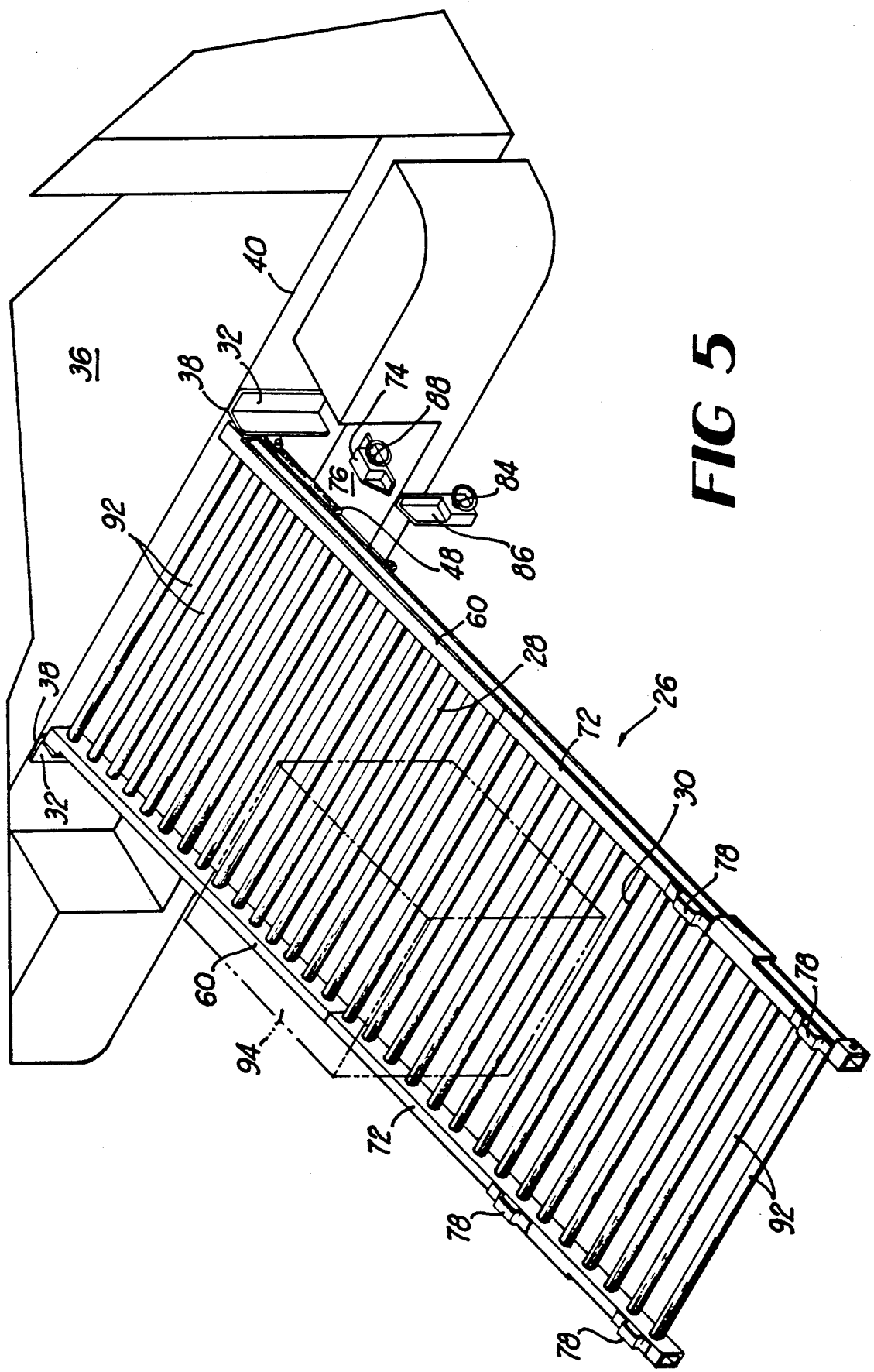
FIG. 5 is a perspective view of an alternate embodiment of the ramp of the present invention fully extended and being used to load or unload goods as shown by the phantom lines.
Figure 6:
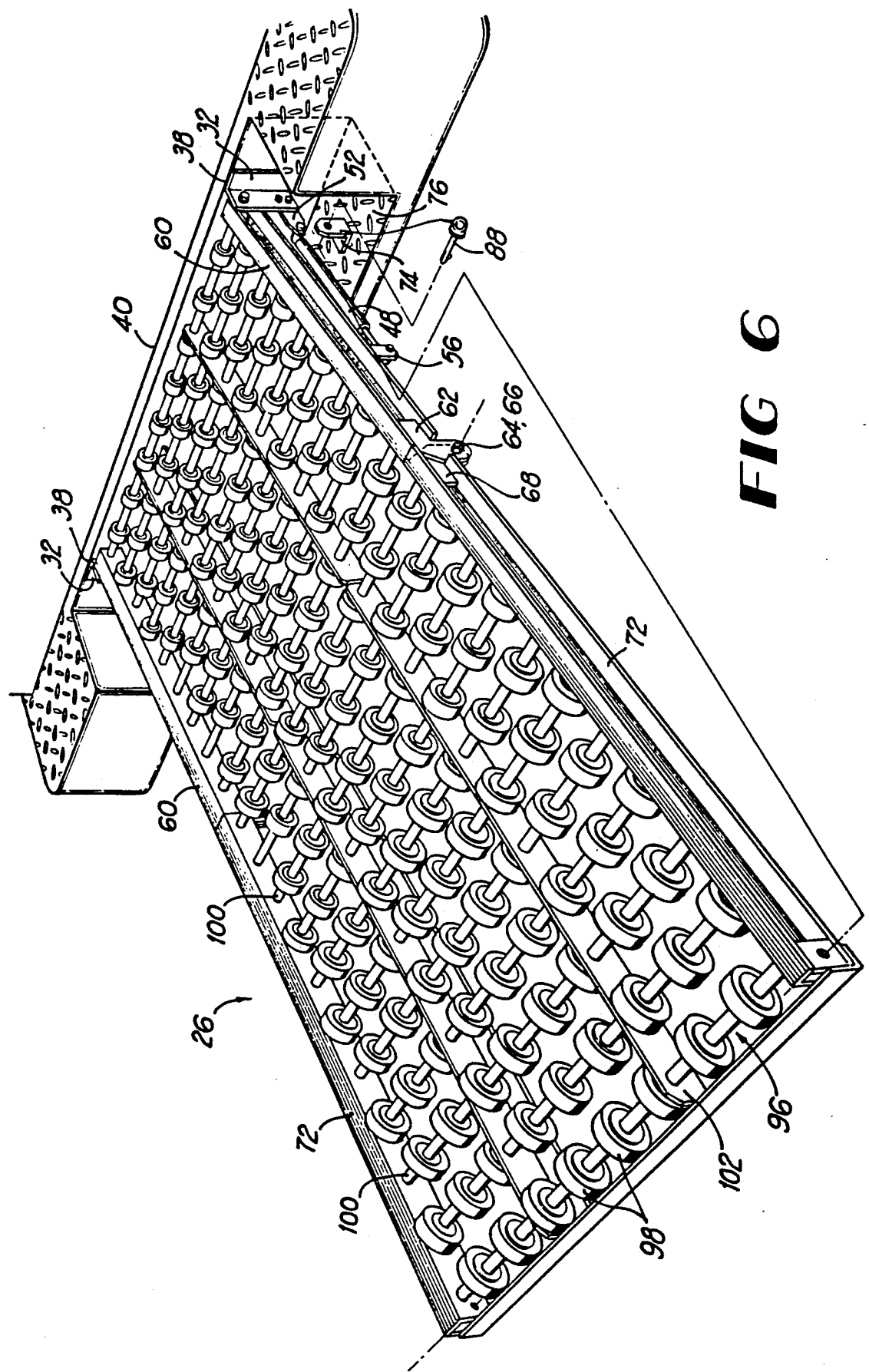
FIG. 6 is a perspective view of an alternate embodiment of the ramp of the present invention fully extended.

FIG. 4 shows ramp 26 of the present invention in the extended position. FIG. 5 shows an alternative embodiment of ramp 26 in the extended position where first and second ramp segments 28 and 30 include rods 92 replacing first and second ramp members 58 and 70. Cargo 94 is shown in phantom lines positioned on rods 92 while being loaded or unloaded. FIG. 6 shows an alternate embodiment of ramp 26 including skate wheel assemblies 96 positioned in the center of first and second ramp segments 28 and 30. Skate wheel assemblies 96 consist of rows of skate wheel conveyor rollers 98 rotatably mounted on axles 100 spanning the width of ramp 26 and connected to first and second side pieces 60 and 72. Such skate wheel assemblies 96 also may include "U" shaped roller supports and roller support braces spanning the width of ramp 26 and connected to first and second side pieces 60 and 72 substantially as shown in U.S. patent application Ser. No. 099,152, filed Sept. 21, 1987, which application is incorporated herein by reference, and one or more longitudinal stabilizer bars 102 traversing the length of first or second ramp segments 28 or 30 through which axles 100 extend. Use of skate wheel assemblies 96 facilitate the movement of goods along ramp 26, allowing the loading and unloading of cargo to be accomplished more quickly and easily.

Figure 7:
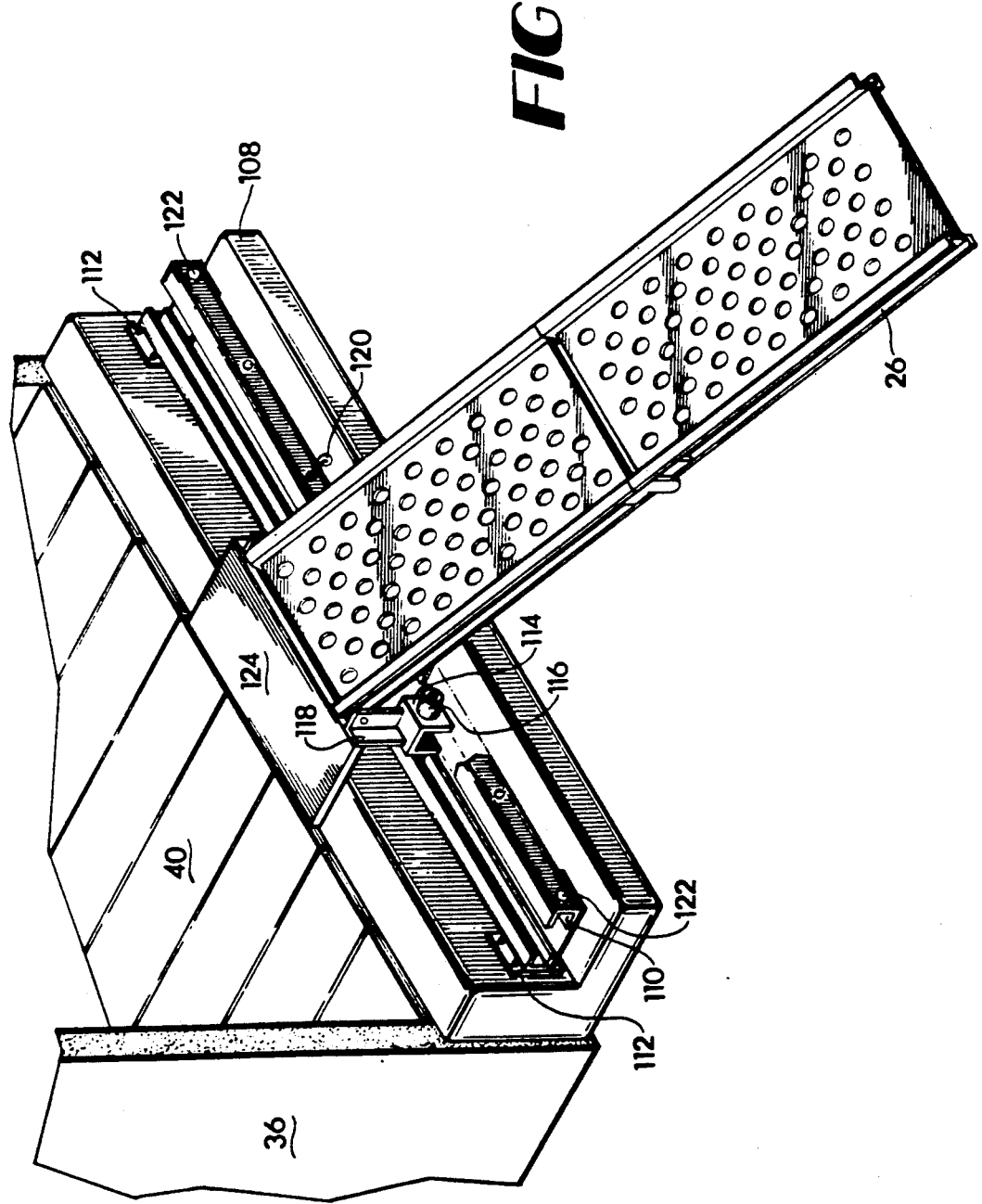
FIG. 7 is a perspective view of an alternate embodiment of the ramp of the present invention fully extended and slidably attached to a vehicle bumper.

FIG. 7 details an embodiment of the present invention in which ramp 26 may move laterally along a vehicle bumper 108. Transverse tracks 110 are mounted substantially parallel to each other and to bumper 108 with mounts 112. Ramp 26 includes a pair of trolleys 114 having rotatable trolley wheels 116 and mounted to the ramp 26 with mounts 118. Trolley wheels 116 engage tracks 110 (typically having a "U" shaped cross-section), allowing ramp 26 to be rolled into position at any point along bumper 108 to facilitate the loading and unloading operations. Once ramp 26 is appropriately positioned, locking pin 120 may be used to prevent accidental movement while in use. Trolley stops 122 attached at the ends of tracks 110 preclude the ramp from rolling off the tracks 110, and filler step 124 connected to ramp 26 provides a buffer or interface between vehicle bed 40 and the ramp 26. As discussed in connection with FIGS. 1-3, ramp 26 may be folded compactly while not in use (FIGS. 1-2) or deployed in a half-ramp arrangement (FIG. 3).

The foregoing is provided for purposes of illustration, explanation, and description of the present invention. Modifications and adaptations to these embodiments will be apparent to those of ordinary skill in the art and they may be made without departing from the scope or spirit of the invention.

What is claimed is:

1. A ramp for loading and unloading a vehicle bed having an edge comprising:
   (a) means for attaching the ramp to a vehicle so as to permit lateral movement of the ramp relative to the vehicle, comprising:
      (i) a track mounted on the vehicle proximate the edge of the bed; and
      (ii) a trolley connected to the ramp and having at least one wheel rotatably engaging the track;
   (b) a first ramp segment;
   (c) means for pivotally connecting the first ramp segment to the attaching means;
   (d) a second ramp segment;
   (e) means for pivotally connecting the second ramp segment to the first ramp segment;
   (f) a plurality of stops connected to the track for limiting the range of lateral movement of the ramp relative to the vehicle; and
   (g) means, detachably engaging the track and trolley, for selectively locking the ramp in one of a plurality of positions along said track and preventing lateral movement of the ramp relative to the vehicle.

2. A ramp according to claim 1 in which the track and trolley each include at least one aperture and the locking means is a pin for inserting into the track and trolley apertures.

3. A ramp according to claim 2 in which the means for pivotally connecting the first ramp segment to the attaching means precludes lateral movement of the first and second ramp segments relative to the trolley.

4. A ramp according to claim 3 in which (1) the first ramp segment has an upper surface, (2) the first and second ramp segments each have a first end, the means for pivotally connecting the first and second ramp segments serving to connect said respective first ends together, and (3) the bed defines a plane, further comprising means for attaching the second ramp segment at a position remote from its first end to the vehicle so that the second ramp segment may support the first ramp segment in a manner which allows the upper surface of the first ramp segment to lie in a plane substantially parallel to the plane of the bed.

5. A ramp according to claim 1 in which (1) the first ramp segment has an upper surface, (2) the first and second ramp segments each have a first end, the means for pivotally connecting the first and second ramp segments serving to connect said respective first ends together, and (3) the bed defines a plane, further comprising means for attaching the second ramp segment at a position remote from tis first end to the vehicle so that the second ramp segment may support the first ramp segment in a manner which allows the upper surface of the first ramp segment to lie in a plane substantially parallel to the plane of the bed.

6. A ramp for loading and unloading a vehicle bed having an edge comprising:
   (a) means for attaching the ramp to a vehicle so as to permit lateral movement of the ramp relative to the vehicle, comprising:
      (i) a track mounted on the vehicle proximate the edge of the bed, and including an aperture; and
      (ii) a trolley connected to the ramp including an aperture, and having at least one wheel rotatably engaging the track;
   (b) a first ramp segment;
   (c) means for pivotally connecting the first ramp segment to the attaching means which precludes lateral movement of the first ramp segment relative to the trolley.
   (d) a plurality of stops connected to the track for limiting the range of lateral movement of the ramp relative to the vehicle; and
   (e) a pin, detachably engaging the apertures of the track and trolley, for selectively locking the ramp in one of a plurality of positions along said track and preventing lateral movement of the ramp relative to the vehicle.

7. A ramp according to claim 6 further comprising a second ramp segment and means for pivotally connecting the second ramp segment to the first ramp segment and in which (1) the first ramp segment has an upper surface, (2) the first and second ramp segments each have a first end, the means for pivotally connecting the first and second ramp segments serving to connect said respective first ends together, and (3) the bed defines a plane, further comprising means for attaching the second ramp segment at a position remote from its first end to the vehicle so that the second ramp segment may support the first ramp segment in a manner which allows the upper surface of the first ramp segment to lie in a plane substantially parallel to the plane of the bed.

* * * * *